Dec. 3, 1929.  E. H. STEEDMAN  1,738,403
VALVE STRUCTURE FOR COMPRESSORS
Filed July 15, 1927   2 Sheets-Sheet 1

INVENTOR
EDWIN H. STEEDMAN
By Bakewell & Church
ATTORNEYS

Dec. 3, 1929.  E. H. STEEDMAN  1,738,403
VALVE STRUCTURE FOR COMPRESSORS
Filed July 15, 1927  2 Sheets-Sheet 2
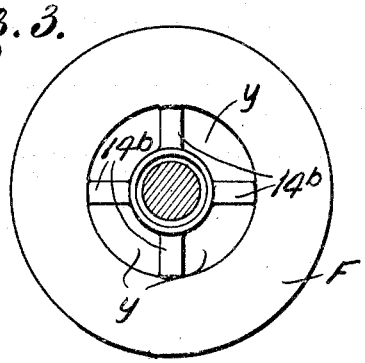
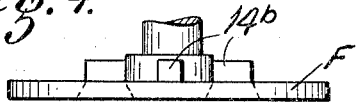
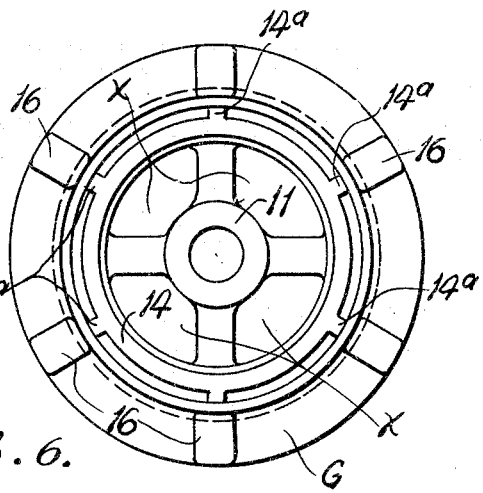
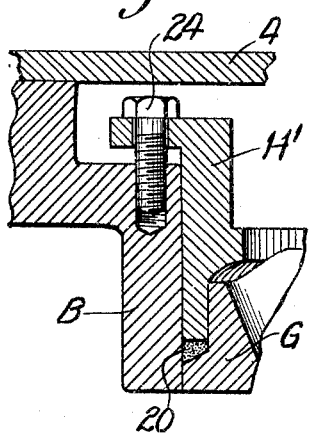
INVENTOR:
EDWIN H. STEEDMAN.
BY Bakewell & Church
ATTORNEYS Patented Dec. 3, 1929

1,738,403

UNITED STATES PATENT OFFICE

EDWIN H. STEEDMAN, OF ST. LOUIS, MISSOURI, ASSIGNOR TO CURTIS MANUFACTURING COMPANY, OF WELLSTON, MISSOURI, A CORPORATION OF MISSOURI

VALVE STRUCTURE FOR COMPRESSORS

Application filed July 15, 1927. Serial No. 206,010.

This invention relates to valve structures for compressors of the type in which the inlet valve and discharge valve of each cylinder are of annular form and are arranged in concentric relation in the head of the cylinder.

The objects of my invention are, to provide a novel valve structure of the general type mentioned, that comprises a minimum number of parts and a minimum number of joints in which leaks can develop; that is inexpensive to manufacture and easy to maintain in an operative condition; that can be assembled quickly to form a complete unit which can be installed in or removed from a bore in the cylinder head without breaking any pipe connections; that is of such construction that a part of same which is normally clamped tightly against a shoulder on the cylinder head will be dislodged or disengaged from said shoulder when the device that retains the structure in the cylinder head is released or unscrewed preparatory to moving the structure, and which is of such design that the valves have maximum effective openings with minimum clearance.

To this end I have devised a compressor whose head is provided with a bore that receives a removable valve structure composed of a valve seat member equipped with inlet ports and discharge ports, and combined with inlet and discharge valves that are interposed between said valve seat member and abutment members that are arranged above and below the valve seat member, said valve structure being retained in operative position in the bore in the cylinder head by a retaining device that projects into said bore and which is connected with said head by screw threads or fastening devices, or any other suitable means. The cylinder head is preferably provided with a shoulder at the lower end of said bore against which the valve seat member is clamped by the pressure which the retaining device exerts on same, and in the form of my invention herein illustrated said retaining device is provided with a portion that co-operates with a part of the structure to dislodge the valve seat member and bodily move the entire structure upwardly through the bore in the cylinder head when said retaining device is manipulated to release the same and withdraw it from the bore in the head.

Figure 1 of the drawings is a vertical sectional view of a valve structure constructed in accordance with my invention.

Figure 3 is a top plan view of the bottom abutment member.

Figure 4 is a side elevational view of said bottom abutment member.

Figure 5 is a bottom plan view of the top abutment member; and

Figure 6 is a detail, vertical sectional view, illustrating another form of retaining device that may be used.

Figure 1:
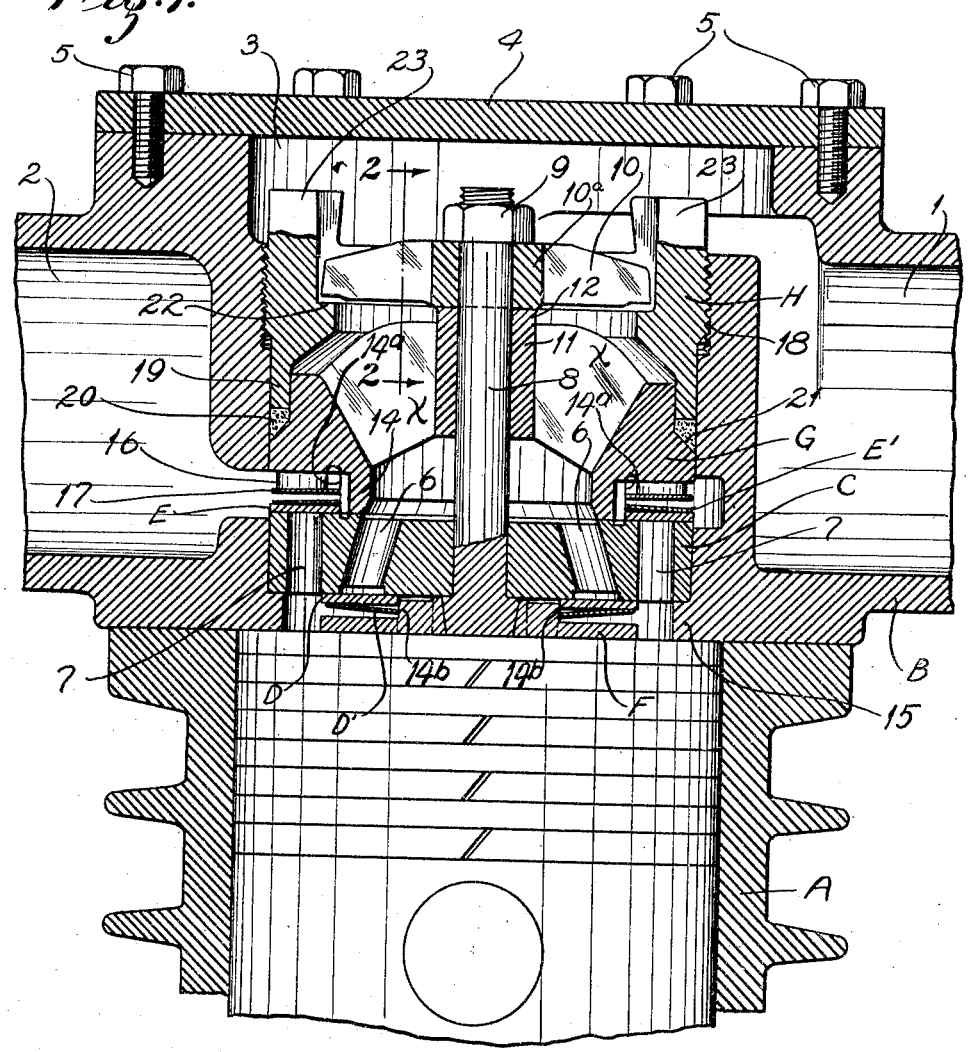

Referring to the drawings which illustrate the preferred form of my invention, A designates the cylinder of a compressor, B designates the head of said cylinder which can either be of the removable type or integrally connected with the cylinder, 1 designates an intake chamber in said head, 2 designates a discharge chamber of said head and 3 designates a bore in said head which is preferably arranged in longitudinal alignment with the cylinder. A valve structure that comprises an inlet valve and a discharge valve is removably mounted in said bore 3, the upper end of said bore being normally closed by a removable cover plate 4 that is detachably connected by fastening devices 5 to the cylinder head B.

Figure 2:
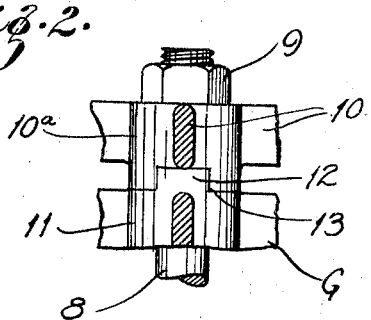
Figure 2 is a detail sectional view, taken on the line 2—2 of Figure 1.

Said valve structure comprises a disk-shaped valve seat member C provided with an annular row of inlet ports 6 and an annular row of outlet ports 7 that surround the inlet ports, a flat inlet valve D of annular form that acts on a flat seat on the underside of the valve seat member C, a flat discharge valve E of annular form that acts on a flat seat on the top side of the valve seat member, and abutment members F and G of substantially skeleton construction, arranged below and above the valve seat member C. The valve seat member and the two abutment members are herein illustrated as being normally held clamped tightly together by a bolt 8 that projects upwardly through the abutment member G and which is provided at its upper end with a nut 9 that exerts downward pressure on a spider or member 10 of skeleton-like construction whose hub 10ª bears against the upper end of the hub 11 of the top abutment member G, said bolt 8 either being integrally connected to the abutment member F or projecting upwardly through a hole in said member. In order to hold the arms or radially-disposed portions of the spider 10 and of the top abutment member G in vertical alignment with each other, so as to not retard the passage of the medium to be compressed that is sucked into the cylinder from the inlet chamber 1 in the head of the cylinder, the hub 11 of the bottom abutment member G is provided in its upper side with a rib 12, as shown in Figure 2, that fits in a groove or depression 13 formed in the underside of the hub 10ª of the spider 10, the said interlocking connection between the spider 10 and top abutment member also preventing the bolt 8 from being twisted off during the manipulation of the retaining device, hereinafter described, in the event the valve seat member sticks in the cylinder head. Said abutment member G is provided on its underside with a depending, annular flange 14 that bears on the top side of the valve seat member C at a point between the two annular rows of ports 6 and 7 in said member, and a shoulder 15 is formed on the cylinder head preferably at the lower end of the bore 3, so as to serve as a support for the valve seat member C. Air openings $x$ are formed in the abutment member G, as shown in Figure 5, and said member is also provided with a plurality of vertically-disposed ribs 14ª that project radially from the annular flange 14, and thus act as guides for the valve E and its actuating spring and hold said valve and spring in such a position that the air can flow over the inner and outer edges of said valve. The abutment member F is also provided with air openings $y$, and with radially-disposed ribs 14ᵇ whose outer ends serve as guides for the valve D and the actuating spring of said valve, said guides holding the valve D in such a position that the air can pass over the inner and outer edges of said valve. In small valves the ports $y$ in the abutment member F can be omitted as well as the air passageways between the ribs 14ª and flange 14 on the abutment member G.

A spring D' is interposed between the inlet valve D and the lower abutment member F that is arranged in opposed relation to the seat of the inlet valve, and a spring E' is arranged between the discharge valve E and the upper abutment member G that is arranged in opposed relation to the seat of said discharge valve. Said valve springs can be of any preferred type, but I prefer to form said springs from annular members that are slightly bent, as shown in Figure 1, and which are so arranged as to act on the inlet valve and discharge valve and hold said valves tightly against their co-operating seats on the valve seat member C. In order to provide considerable clearance for the compressed medium that escapes from the cylinder through the discharge ports 7 when the discharge valve E opens, the top abutment member G is so constructed that there is a space of considerable height between the body of said member and the valve E, said abutment member G being provided on its underside with a plurality of spaced lugs 16 that form a supporting surface for a washer 17 against which the valve spring E' bears, said washer being held centered by the guides 14ª, previously described.

The structure above referred to is retained in operative position in the cylinder head by a retaining device H, which, in the form of my invention shown in Figure 1, consists of a nut that is screwed into screw threads 18 on the side wall of the bore 3 in the cylinder head and which is provided at its lower end with an annular portion 19 that acts on packing 20 which is positioned in an annular space between the abutment member G and the side wall of the bore 3 in the cylinder head in contact with an inclined surface 21 on said abutment member. When the nut H is screwed downwardly pressure is exerted on the top abutment member G in a direction to compress the packing 20 and to cause the valve seat member C to be clamped tightly against the shoulder 15 on the cylinder head. This forms an air-tight joint between the upper surface of the valve seat member C and the annular flange 14 on the abutment member G, and it also forms a gas-tight joint between the cylinder head and top abutment member G. In order that the valve structure may be easily removed from the cylinder head, the nut or retaining device H is provided on its inner side with a portion, preferably constructed in the form of an annular shoulder 22, that is positioned under the ends or terminal portions of the radially-projecting arms of the spider 10. When the nut H is released or screwed upwardly out of the bore 3 in the cylinder head, the shoulder 22 on said nut will exert upward pressure on the spider 10, and thus exert a pull on the entire valve structure in a direction to disengage the valve seat member C from the shoulder 15 on the cylinder head and also cause said valve structure to move upwardly through the bore in the cylinder head. Preferably, the nut H is provided at its upper end with upwardly-projecting lugs 23 of such shape that a spanner wrench can be engaged with same to facilitate the operation of screwing said nut into and out of the bore in the cylinder head.

Instead of constructing the retaining device in the form of a nut that is screwed into the bore in the cylinder head, said retaining device can consist of an annular member H', as shown in Figure 6, that fits snugly in the bore in the cylinder head and compresses the packing 20 against the top abutment member G, said member H' being retained in position by screws 24 that are screwed into the cylinder head.

A valve structure of the kind above described is inexpensive to manufacture and is easy to maintain in an operative condition, because it comprises a minimum number of parts and a minimum number of joints in which leaks are apt to develop; it can be assembled completely outside of the cylinder head and then installed as a unit in the cylinder head simply by screwing the nut H into the internally screw-threaded portion on the side wall of the bore 3 in the head; it can be easily removed from the head, due to the fact that the operation of unscrewing the nut H dislodges the valve seat member C from its co-operating shoulder 15 on the cylinder head and causes the entire structure to move upwardly through the bore in the head, and the inlet and discharge valves are quiet in operation and have ample clearance for the admission of the medium being compressed and for the discharge of the compressed medium from the cylinder, and considering the area of the suction and discharge valve ports, provides a valve structure with a minimum clearance volume.

Having thus described my invention, what I claim as new and desire to secure by Letters Patent is:

1. In a compressor, the combination of a cylinder head provided with a cylindrical bore, a substantially disk-shaped valve seat member in said bore arranged on a shoulder on the cylinder head and provided with inlet ports and discharge ports, valves for controlling said ports arranged to act on valve seats on the top and bottom faces of said member, abutment members arranged above and below the valve seat member, springs interposed between the valves and said abutment members, a gland in the upper end of the bore in the cylinder head, and a packing interposed between said gland and the upper valve abutment member.

2. In a compressor, the combination of a cylinder head provided with a bore, a substantially disk-shaped valve seat member in said bore arranged on a shoulder on the cylinder head and provided with inlet ports and discharge ports, valves for controlling said ports arranged to act on valve seats on the top and bottom faces of said member, abutment members arranged above and below the valve seat member, springs interposed between the valves and said abutment members, means for clamping the abutment members to the valve seat member, a gland in the upper end of the bore in the cylinder head, a packing interposed between said gland and the upper abutment member, a spider arranged above the upper abutment member and combined with same, and a portion on said gland that co-operates with said spider to move the valve structure upwardly through the bore in which it is positioned when said gland is removed.

3. In a compressor, the combination of a part provided with a bore, a valve structure housed in said bore and comprising a substantially disk-shaped valve seat member that rests upon a shoulder in said bore, an inlet valve and a discharge valve that act on seats formed on the opposite faces of said valve seat member, abutment members arranged above and below the valves, and a retaining device for the valve structure detachably connected to the part in which said bore is formed and arranged so as to exert pressure on one of said abutment members in a direction to hold said valve seat member against the shoulder provided for the same.

4. In a compressor, the combination of a cylinder head provided with a cylindrical bore, a valve structure removably mounted in said bore and comprising a valve seat member combined with an inlet valve and a discharge valve, a shoulder on the head on which said valve seat member rests, a retaining device for the valve structure detachably connected to the head and arranged so as to cause said valve seat member to be pressed tightly against the shoulder provided for the same, and a packing positioned between said retaining device and a part of the valve structure, for forming a tight joint between said structure and the cylinder head at a point above the valves.

5. In a compressor, the combination of a cylinder head equipped with a cylindrical bore, a valve structure removably mounted in said bore and comprising a valve seat member, inlet and discharge valves and valve abutment members, packing between the head and one of said abutment members, and a retaining device detachably connected to the head for holding said valve structure in operative position in the head, said retaining device having a portion that co-operates with a part of said structure to dislodge the packed valve seat member in the operation of removing the retaining device.

6. In a compressor, the combination of a cylinder head provided with a bore, a removable valve structure in said bore comprising a substantially flat, disk-shaped valve seat member that rests upon a supporting surface on the head, abutment members arranged above and below said valve seat member, valves positioned between said abutment members and seats on the top and bottom faces of the valve seat member, and a retaining device screwed into a threaded portion of the side wall of said bore for clamping said valve seat member against the said supporting surface on the cylinder head.

7. In a compressor, the combination of a cylinder head provided with a cylindrical bore, a removable valve structure in said bore comprising a valve seat member that rests on a supporting surface on the head, an inlet valve and a discharge valve that act on the bottom and top faces of said valve seat member, abutment members which co-operate with springs that hold the valves seated, and a retaining device detachably connected to the head separate and distinct from said abutment members, and arranged to co-act with a packing in said bore to hold said valve structure in operative position and also produce tight joints between the same and the cylinder head.

8. In a compressor, the combination of a cylinder head provided with a bore, a removable valve structure in said bore comprising a substantially flat, disk-shaped valve seat member provided with inlet and outlet ports, abutment members arranged above and below the valve seat member, valves for controlling said ports positioned between said valve seat member and abutment members, springs for holding said valves seated, a supporting surface on the head on which said valve seat member bears, a means for holding said valve structure in operative position in the bore in the cylinder head, and for producing a packed joint between said valve structure and head, and guides on the abutment members for the valves.

9. In a compressor, the combination of a cylinder head provided with a bore, a removable valve structure in said bore comprising a valve seat member that bears on a supporting surface on the head, inlet and discharge ports in said member, annular valves that act on the top and bottom faces of said valve seat member and which are constructed so that the medium drawn into or discharged from the cylinder of the compressor can flow over the inner and outer edges of each valve, and means for clamping said valve seat member tightly against said supporting surface.

10. In a compressor, the combination of a cylinder head provided with a bore, a removable valve structure in said bore, packing arranged between the head and one member of the valve structure, a removable retaining device for the structure arranged to compress the packing, and means for causing the packed member to be dislodged when said retaining device is removed from the head.

11. In a compressor, the combination of a cylinder, a valve supporting member provided with a bore, a valve seat member in said bore that bears against a shoulder on the valve supporting member, valves for controlling inlet ports and discharge ports in said valve seat member, arranged so as to bear on the top and bottom faces of said member, top and bottom abutment members arranged above and below said valve seat member, and a retaining nut separate and distinct from said valve seat member, detachably connected to said valve supporting member and arranged to co-act with a packing in said bore to produce a tight joint between the side wall of the bore and the top abutment member, and also force the valve seat member tightly against the shoulder provided for same.

12. In a compressor, the combination of a cylinder, a head for said cylinder provided with a bore, a removable valve structure in said bore, comprising a valve seat member arranged between two abutment members and provided with inlet and outlet ports, valves for controlling said ports, arranged between said abutment members and valve seat member, and a packing device jammed into the space between the side wall of the bore and the peripheral edge of one member of said valve structure.

EDWIN H. STEEDMAN.